United States Patent [19]

Brieuc

[11] 4,427,180

[45] Jan. 24, 1984

[54] LINEAR HYDRAULIC WINCH COMPRISING A PAIR OF SELF-CLAMPING JAWS CLAMPING ALTERNATELY THE AXIAL CABLE

[75] Inventor: Robert Brieuc, Nanterre, France

[73] Assignee: Kley-France, France

[21] Appl. No.: 339,164

[22] Filed: Jan. 13, 1982

[30] Foreign Application Priority Data

Jan. 19, 1981 [FR] France ............................. 81 00891

[51] Int. Cl.³ ............................................... B66F 1/00
[52] U.S. Cl. .................................................... 254/106
[58] Field of Search ................ 254/106; 24/263 SW, 24/263 DT, 136 R; 294/102 A, 102 R; 187/90

[56] References Cited

U.S. PATENT DOCUMENTS

| | | | |
|---|---|---|---|
| 1,307,653 | 6/1919 | Benjamins | 254/106 |
| 1,581,459 | 4/1926 | Lindquist | 187/90 |
| 3,278,158 | 10/1966 | Saldana | 254/106 |
| 3,774,352 | 11/1973 | Weber | 254/104 |
| 4,049,237 | 9/1977 | Mattson | 254/106 |
| 4,277,051 | 7/1981 | Lucas | 254/106 |

FOREIGN PATENT DOCUMENTS

| | | | |
|---|---|---|---|
| 2647400 | 4/1977 | Fed. Rep. of Germany | 294/102 R |
| 1394809 | 3/1965 | France . | |

Primary Examiner—Robert C. Watson

[57] ABSTRACT

A linear hydraulic winch is provided comprising a frame to which are fixed symmetrically two hydraulic double-acting jacks, enclosing two self-clamping jaws for alternately clamping the axial cable to the end of which the load is fixed, aligned along the axis of symmetry of said winch, one of them being interlocked in translation, along said axis, with the cylinders of these jacks and the other with the pistons thereof. These self-clamping jaws are formed by wedges comprising cylinders inserted between the corresponding oblique faces of their outer and inner elements, said cylinders being truncated through two parallel planes, symmetrical with respect to their axes, and perpendicular to said oblique faces.

7 Claims, 5 Drawing Figures

LINEAR HYDRAULIC WINCH COMPRISING A PAIR OF SELF-CLAMPING JAWS CLAMPING ALTERNATELY THE AXIAL CABLE

BACKGROUND OF THE INVENTION

The present invention relates to a linear hydraulic winch comprising a pair of self-clamping jaws alternately clamping the axial cable bearing the load.

French Pat. No. 1,394,809 describes such a linear hydraulic winch comprising a frame to which are fixed symmetrically two hydraulic double-acting jacks, enclosing a pair of self-clamping jaws capable of locking in turn the axial cable at the end of which the load is fixed, these two self-clamping jaws being aligned along the axis of symmetry of the winch, one being interlocked in translation, along said axis of the winch, with the cylinders of these double-acting hydraulic jacks, and the other with the pistons thereof.

The self-clamping jaws proposed in this patent each comprise two bars provided with semi-cylindrical bearing surfaces able to pivot in apertures formed in pivoting links.

The possibilities of controlling such self-clamping jaws, as well as their efficiency and reliability do not correspond to those desirable so as to be able to operate satisfactorily the winch of the present invention.

SUMMARY OF THE INVENTION

To overcome this drawback of the winch described in the above-mentioned French Pat. No. 1 394 809, the present invention provides such a winch characterized in that its self-clamping jaws are formed by cable clamping wedges comprising cylinders inserted between the corresponding oblique faces of their outer and inner elements and in that these cylinders are truncated along two parallel planes, symmetrical with respect to their axes and perpendicular to said oblique faces.

Such clamping wedges have been known for a long time since U.S. Pat. No. 1,581,458 issued on Apr. 20, 1926 already shows the use thereof as a safety brake for elevator cabins but no one had thought up to present of the advantages which they could provide in a linear hydraulic winch comprising a pair of self-clamping jaws alternately clamping the axial cable bearing the load.

BRIEF DESCRIPTION OF THE DRAWINGS

The accompanying drawings show by way of example one embodiment of such a linear hydraulic winch.

DESCRIPTION OF THE PREFERRED EMBODIMENT

Figure 1:
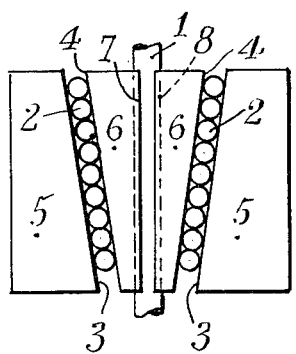
FIG. 1 is a view of a conventional clamping wedge.

The wedge for clamping cable 1 shown in FIG. 1 comprises cylinders with parallel axes 2 inserted between the oblique faces 3 of its fixed elements 5 and those 4 of its movable elements 6, in the inner faces 7 of which are provided grooves 8 in which cable 1 may slide or be locked; it will be understood that, when the movable elements 6 of the clamping wedge are urged downwards in the figure, they transmit a pressure to the fixed elements 5, through their oblique faces 3 and 4 and the interposed cylinders with parallel axes 2, which cause the grooves 8 in their internal faces 7 to clamp on to cable 1 which is locked in position.

Figure 2:
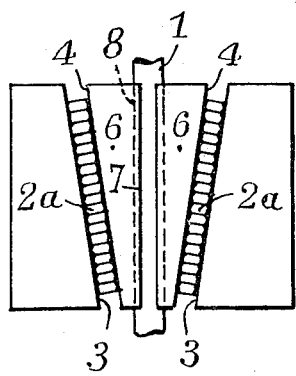
FIG. 2 is a view of the same cable clamping wedge with truncated cylinders.

In the embodiment shown in FIG. 2, these cylinders 2 have been replaced by cylinders 2a, each of which is truncated through two planes parallel to its axis, perpendicular to the oblique surfaces 3 and 4 and symmetrical with respect to this axis; the width of these truncated cylinders is about half the diameter of the cylinders 2 of the conventional wedge shown in FIG. 1, which allows, for the same bearing surface and consequently for transmitting the same force, the length thereof to be reduced by half or possibly the number thereof to be reduced by half.

Figure 3:
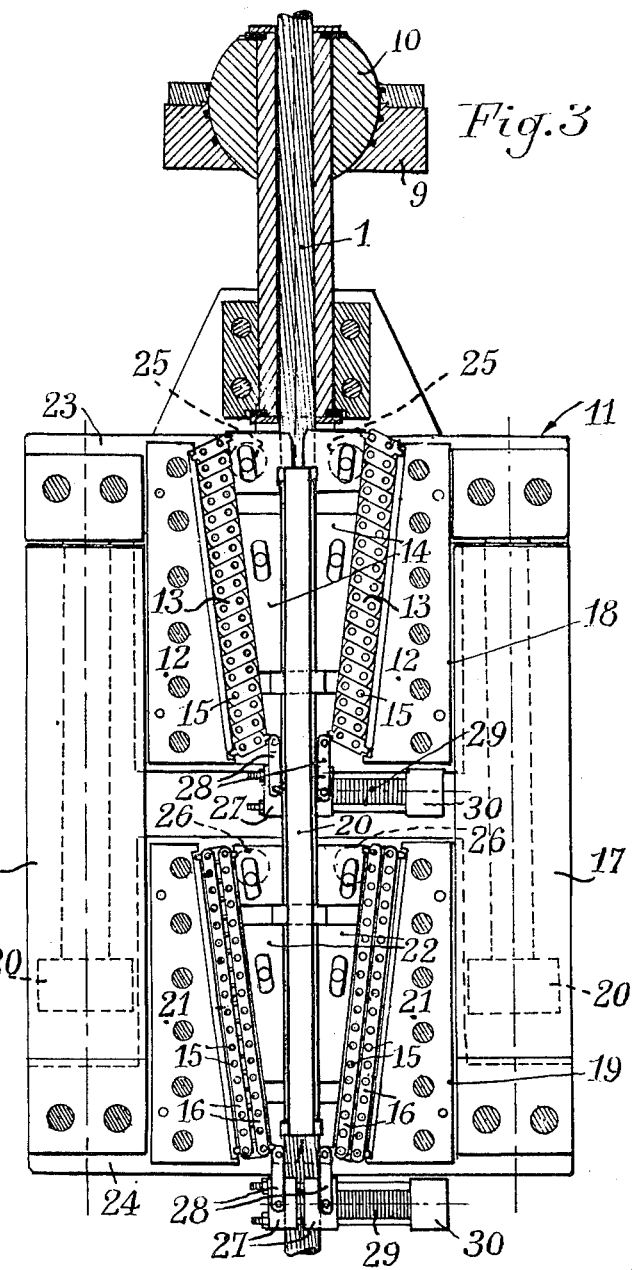
FIGS. 3 and 4 are front views of a linear hydraulic winch using such clamping wedges in the two endmost positions which it may occupy.
Figure 5:
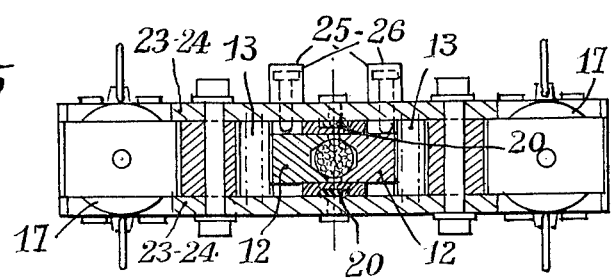
FIG. 5 is a top view, partly in section, of this winch.
Figure 4:
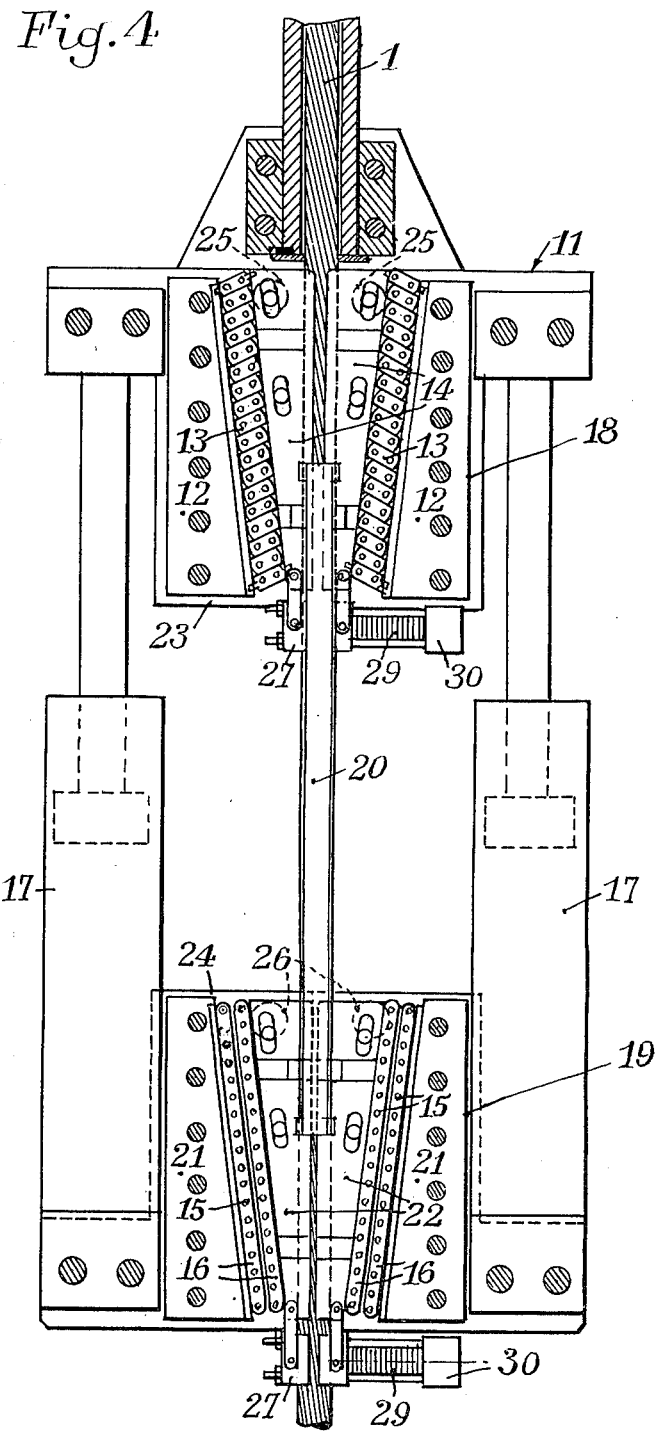

The linear hydraulic jack shown in FIGS. 3 to 5 comprises such wedges for clamping cable 1, aligned one above the other; it is suspended from a beam 9 by means of a ball and socket joint 10, and it comprises a fixed frame 11 to which are fixed the outer fixed elements 12 of the upper clamping wedge, comprising truncated cylinders 13 between the oblique parallel faces of its fixed elements 12 and its inner movable elements 14. These truncated cylinders 13, when they pivot during relative movement of the elements of the clamping wedge, are interlocked with each other by means of pairs of studs 15, engaged in corresponding holes of bars 16, parallel to the oblique bearing faces of the outer 12 and inner 14 elements of the clamping wedge.

With the two double-acting hydraulic jacks 17, disposed parallel to cable 1 on each side thereof and on each side of the two aligned clamping wedges 18 and 19, these two clamping wedges may be moved towards or away from each other, one being interlocked in translation with the cylinders thereof and the other with the pistons thereof.

Means are further provided so that, for lifting the load, corresponding to the retraction of the jacks, the lower clamping wedge 19 is locked on to cable 1 and the upper clamping wedge 18 released, when the two clamping wedges are moved towards each other, and conversely whereas, for lowering the load, corresponding to the extension of the jacks, the lower clamping wedge 19 is locked on to the cable and the upper clamping wedge 18 released, and conversely.

To this end, according to one embodiment of the invention, two friction plates 20 are inserted symmetrically, on each side of cable 1, between the lateral faces of the inner movable elements 14 and 22 of the upper 18 and lower 19 clamping wedges and the flanges 23 and 24 of these clamping wedges; these friction plates 20 are resiliently pressed against said lateral faces by means of springs.

Assuming that the winch is in the position shown in FIG. 3 and that the lower clamping wedge 19 is locked on to cable 1 and the upper clamping wedge 18 released, if the double-acting jacks 17 are operated to cause extension thereof and consequently to move the lower clamping wedge 19 away from the upper clamping wedge 18, the outer elements 21 of the lower clamping wedge 19 are pushed downwardly, which causes unclamping thereof; simultaneously, the friction plates 20 are driven downwards by the inner elements 22 of the lower clamping wedge 19 and so urge the inner elements 14 of the upper clamping wedge 18 downwardly which lock on to cable 1.

The lower clamping wedge 19 may thus move freely away from the upper clamping wedge 18; this latter, clamped on to cable 1, holds this latter fixed and the load which is suspended therefrom at the level previously reached, until the lower clamping wedge 19 arrives in its endmost position corresponding to the maximum extension of the double-acting jacks 17 shown in FIG. 4.

If, at this moment, with the upper clamping wedge 18 locked on to cable 1 and the lower clamping wedge 19 released, the double-acting jacks 17 are operated in the reverse direction, so as to retract them and consequently to bring the lower clamping wedge 19 closer to the upper clamping wedge 18, the outer elements 21 of the lower clamping wedge 19 are drawn upwardly and exert a pressure on the inner elements 22 of said lower clamping wedge 19 which lock on to cable 1; simultaneously, the raising of the inner elements 22 of the lower clamping wedge 19 causes, via the friction plates 20, an upward thrust on the inner elements 14 of the upper clamping wedge 18 which is thus unlocked.

Cable 1 may then freely slide in the upper clamping wedge 18 and the lower clamping wedge 19, drawn upwardly by the two double-acting jacks 17 drags along cable 1 to which it is locked as well as the load suspended from this cable, and this until it reaches the initial position shown in FIG. 3; this cycle may then be repeated as often as necessary so as to gradually raise the load, each time by a height corresponding to the maximum extension of the double-acting jacks, until it has reached the desired level.

The linear hydraulic winch shown further comprises hydraulic locking jacks 25 and 26 which lock the movable inner elements 14 and 22 of the upper 18 and lower 19 clamping wedges in their inactive position. They are used, as will be explained below, during lowering of the load and their action, synchronized with the reciprocal movements of the pistons of the double-acting jacks, may be controlled by means of electric circuits not shown which the pistons of the double-acting jacks may switch on or off automatically during their reciprocating movements.

The operation for lowering the load may for example be achieved as follows:

With the winch for example in the last position reached during raising of the load, shown in FIG. 3, with the lower clamping wedge 19 locked on to cable 1 and the upper clamping wedge 18 released, if it is desired to lower the load, the inner elements 14 of the upper clamping wedge 18 are first of all locked in the released position, by means of the corresponding locking jacks 25.

Then the double-acting jacks 17 are operated so as to extend them; the lower clamping wedge 19 drags downwards the cable 1 to which it is locked as well as the load suspended from this cable, said cable sliding freely in the upper clamping wedge 18 locked in the released position by the locking jacks 25.

Shortly before the lower clamping wedge 19 reaches its low end of travel position shown in FIG. 4, the inner elements 14 of the upper clamping wedge 18 are released by the locking jacks 25 and are immediately dragged downwards by those 22 of the lower clamping wedge 19 and the friction plates 20; lowering of the load is first of all slowed down; the upper clamping wedge 18 then locks on to cable 1 and the friction plates 20 cause the inner elements 22 to be raised, of the inner clamping wedge 19, which is unlocked.

Then these inner elements 22 of the lower clamping wedge 19 are locked in the released position by the corresponding locking jacks 26.

If the double-acting jacks 17 are then operated in the reverse direction so as to retract them, the lower clamping wedge 19 rises freely by sliding along cable 1, since it is locked in the released position, and the upper clamping wedge 18, which is in the clamping position, holds cable 1 and the load which it carries at the level previously reached; the friction of the friction plates 20 on the inner elements 14 of the upper clamping wedge 18 is obviously insufficient to raise them and release the upper clamping wedge 18.

Shortly before the lower clamping wedge 19 reaches its top end of travel position, as shown in FIG. 3, the inner elements 22 of the lower clamping wedge 19 are freed by the locking jacks 26; they are immediately dragged downwards by the friction plates 20; the raising of the lower clamping wedge 19 is first of all slowed down; the lower clamping wedge 19 then locks on to cable 1 which it holds with the load which it carries at the lower level previously reached.

The inner elements 14 of the upper clamping block 18 had first of all been slightly raised, at the end of the upward travel of the lower clamping wedge 19, by the friction plates 20 and had immediately been locked in the released position by the corresponding locking jack 25.

Thus we are back again at the initial position and a new cycle may begin for gradually lowering the load to the desired lower level, each time by a length corresponding to the maximum extension of the double-acting jacks 17.

A safety device may be provided for each of the two upper 18 and lower 19 clamping jacks; it may comprise a pair of safety jaws 27 suspended by links 28 from the movable inner elements 14 and 22 of these clamping wedges, and springs 29 such as a stack of conical washers tending to press the two jaws on to cable 1. This safety device further offers the advantage of completing the action of the friction plates for achieving at the right time the downward or upward sliding and so locking or unlocking of the inner elements 14 and 22 of the upper and/or lower wedges.

Safety hydraulic jacks 30 cause these jaws 27 to be unlocked when the inner elements 14 and 22 are to be held locked in the inactive position by the locking jacks 25 and 26; these jacks 30 may then be controlled directly by the reciprocating movements of the piston of the double-acting jacks 17 by using the same electric circuits as those for the hydraulic jacks 25 and 26.

It will be readily understood that the embodiment of the present invention which has been described above with reference to the accompanying drawings has been given purely by way of indication and is in no wise limiting and that numerous modifications may be made without departing for all that from the scope and spirit of the present invention.

What is claimed is:

1. In a linear hydraulic winch comprising a frame, to which are fixed symmetrically two double-acting hydraulic jacks enclosing a pair of self-clamping jaws capable of locking in turn on to an axial cable at the end of which a load is fixed, said two self-clamping jaws being aligned along the axis of symmetry of the winch, one being interlocked in translation, along said axis of the winch, with the cylinders of these double-acting hydraulic jacks and the other with the pistons thereof, wherein said self-clamping jaws are cable clamping wedges comprising outer and inner elements having corresponding parallel oblique faces forming wedges and two groups of elongated cylinders wedgingly inserted between the corresponding oblique faces of the outer and inner elements, the cylinders of each group of said two groups of cylinders being connected together with the axial cable being located between said two groups of cylinders, said cylinders each being truncated through two parallel planes, symmetrically extending along the longitudinal axes of said each cylinder, the width of each of said truncated cylinders as measured between said parallel planes being about half of the diameter of said each cylinder, whereby movement of the oblique surface of said inner element towards the oblique surface of said outer element wedgingly compresses said cylinders between such oblique surfaces.

2. The winch as claimed in claim 1, wherein each of its two aligned clamping wedges is provided at its lower part with a pair of safety jaws and with springs which tend to press constantly these jaws on to the cable passing therebetween, said jaws being connected by means of links to the movable inner elements of the clamping wedges.

3. The winch as claimed in claim 2, wherein safety hydraulic jacks allow said safety jaws to be locked in the inactive position.

4. The winch as claimed in claim 3, wherein the operation of said safety hydraulic jacks is controlled by the movement of the pistons of the double-acting jacks in their cylinders.

5. In a linear hydraulic winch comprising a frame, to which are fixed symmetrically two double-acting hydraulic jacks enclosing a pair of self-clamping jaws capable of locking in turn on to an axial cable at the end of which a load is fixed, said pair of self-clamping jaws being aligned along the axis of symmetry of the winch, one being interlocked in translation, along the axis of the winch, with the cylinders of these double-acting hydraulic jacks and the other with the pistons thereof, wherein said self-clamping jaws are cable clamping wedges comprising outer and inner elements having corresponding parallel oblique faces forming wedges wherein said wedges include flanges and cylinders inserted between the corresponding oblique faces of their outer and inner elements, said cylinders being truncated through two parallel planes, symmetrical with respect to their axes, and perpendicular to said oblique faces and wherein friction plates are clamped resiliently between the lateral faces of the inner movable elements of said clamping wedges and said flanges of said clamping wedges, so as to control the sliding in one direction or in the other of the elements, the ones by the others.

6. The winch as claimed in claim 5, wherein locking hydraulic jacks allow the inner elements of the clamping wedges to be locked at will in the inactive position.

7. The winch as claimed in claim 6, wherein the operation of the locking hydraulic jacks is controlled automatically by sliding of the pistons of the double-acting hydraulic jacks in their cylinders during operation of the winch.

* * * * *